March 23, 1971 H. J. J. KRAAKMAN 3,572,373
PRESSURE-REGULATING VALVE
Filed Sept. 16, 1969
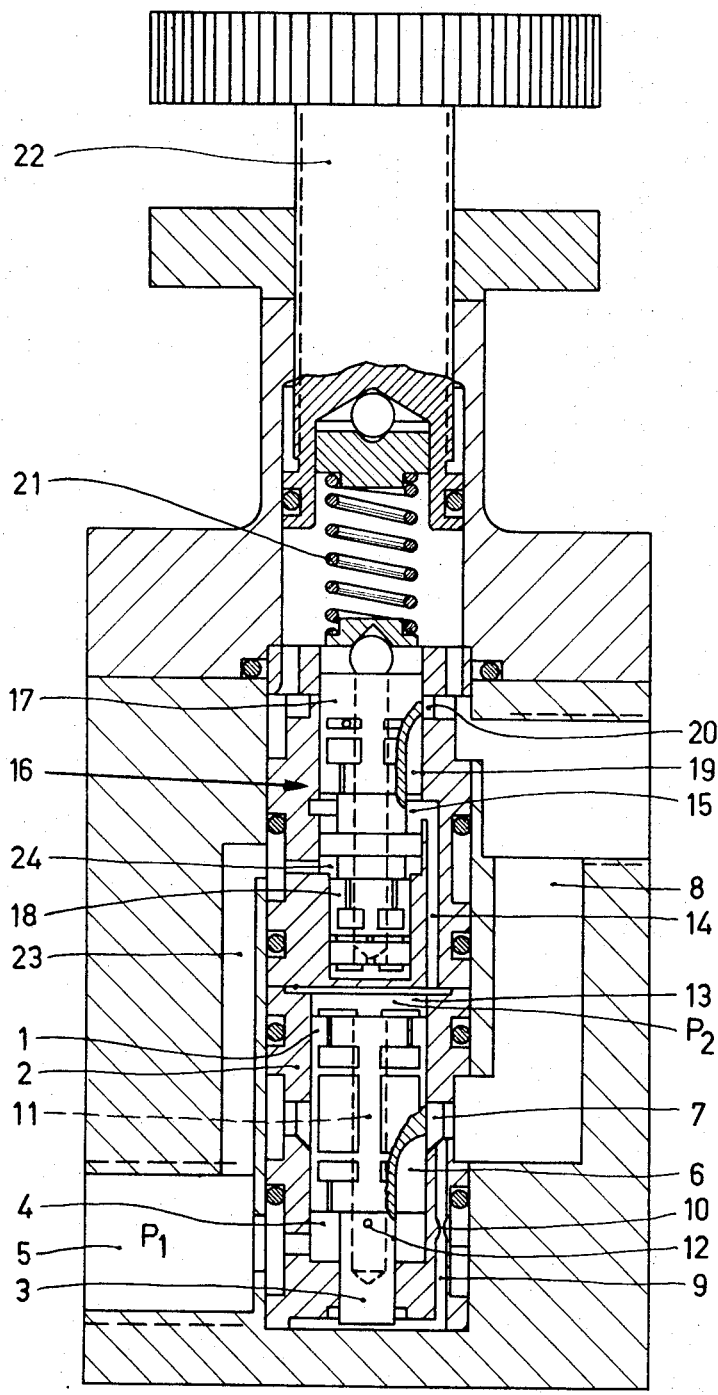
INVENTOR.
HILLEBRAND JJ. KRAAKMAN
BY
AGENT United States Patent Office 3,572,373
Patented Mar. 23, 1971

3,572,373
PRESSURE-REGULATING VALVE
Hillebrand Johannes Josephus Kraakman, Emmasingel, Eindhoven, Netherlands, assignor to U.S. Philips Corporation, New York, N.Y.
Filed Sept. 16, 1969, Ser. No. 858,446
Claims priority, application Netherlands, Sept. 18, 1968, 6813311
Int. Cl. F16k 17/10
U.S. Cl. 137—491                                          2 Claims

ABSTRACT OF THE DISCLOSURE

A pressure-regulating valve for a hydraulic medium in which a valve body is axially movable in a cylinder. Fluid is active on the front side of the valve body and fluid having an adjustable control pressure is active on the rear side of the valve. The fluid on the front side is the medium to be regulated. The two sides of the valve body communicate with each other through a restriction. The outer circumference of the valve body comprises at least one adjustable outlet port for the fluid with the pressure to be regulated. The front side of the regulating valve communicates with an annular chamber which is formed in a spring-loaded control valve which comprises at least two valve parts movable in a cylinder and having different outside diameters. One wall of the annular chamber is formed by an annular surface of the valve part situated at right angles to the center line of the valve and having the larger outside diameter, said valve part comprising a further annular chamber which communicates through a duct with the space behind the regulating valve. The outer circumference of said valve has at least one outlet port of a controllable size.

The invention relates to a pressure-regulating-valve for adjusting to a desired value, the pressure of a hydraulic medium. The valve comprises a valve body, which is axially movable in a cylinder, the space in the cylinder on the front side of the valve body communicating with the hydraulic medium whose pressure is to be regulated. The space in the cylinder on the rear side of the valve communicates with liquid in which an adjustable control pressure prevails, the two spaces communicating with each other through a restriction.

The known pressure-regulating valves are generally satisfactory only when the requirements for accuracy of the pressure to be regulated are not great. Nowadays, however, an increasing demand for extremely accurately operating regulating apparatus exists. Examples of the need for such apparatus are in machine tools, such as, lathes, milling machines and the like, with which extremely accurate parts are to be manufactured with optically accurate surfaces. An accuracy of size of $0.1\mu$ and an admissible surface roughness smaller than $\frac{1}{2}$ ru=approximately $0.01\mu$ is imposed upon articles manufactured with such machine tools. It will therefore be obvious that the apparatus for regulating such a machine tool must satisfy very stringent requirements for accuracy.

It is the object of the invention to provide a pressure-regulating valve of the above-mentioned type, in which the accuracy of the pressure to be regulated is very high. In order to achieve this, according to the invention the pressure regulating valve is characterized in that the outer circumference of the valve body comprises at least one recess which communicates with the space on the front side of the valve body and which opens into an outlet chamber accommodated in the cylinder, said outlet chamber communicating with an outlet duct for the hydraulic medium, the space on the front side of the regulating valve communicating with an annular chamber which is formed in a spring-loaded control valve, said control valve comprising at least two cylindrical valve parts having mutually different outside diameters, said valve parts being axially guidable in a cylinder, one wall of the annular chamber being formed by an annular surface of the valve part having the largest outside diameter, said valve part comprising a further annular chamber which communicates through a duct with the space behind the regulating valve, at least one recess being provided on the outer circumference of said valve part and communicating with the further annular chamber and opening into an outlet space incorporated in the cylinder, said outlet space communicating with an outlet duct for the hydraulic medium.

The valve body of the regulating valve is loaded on the front side by the medium whose pressure is to be regulated and is loaded on the rear side by the medium in which a control pressure prevails, which is adjusted in the control valve. The control pressure in the said control valve is adjusted in accordance with the prevailing value of the pressure to be regulated. As a result of this a very accurate adjustment of the pressure to be regulated is obtained.

In order that the invention may be readily carried into effect, one embodiment thereof will now be described in greater detail, by way of example, with reference to the accompanying drawing, the sole figure of which shows one embodiment of the pressure-regulating valve according to the invention.

In a cylinder 2 a valve body 1 is axially movable. The front side of the valve body 1 comprises an elongated cylindrical part 3. The space 4 on the front side of the valve body communicates through a duct 5 with a duct not shown which contains hydraulic medium, the pressure of which, denoted by $p_1$, is to be accurately maintained at a desirable value. The valve body 1 comprises recesses 6 which communicate with the space 4 and open into an outlet chamber 7. The outlet chamber 7 is arranged in the wall of the cylinder 2 and has an annular construction. The recesses 6 and the outlet chamber 7 together constitute outlet ports of adjustable size, through which ports hydraulic medium can be removed from the space 4. A duct 8 extends from the outlet chamber to an outlet duct not shown for the hydraulic medium. The duct 8 communicates, through a passage 9, with the front side of the part 3 of the valve body 1. Said passage may comprise a restriction 10 which operates as a resistance and serves for the dynamic stability of the regulating valve. A bore 11 is present in the valve body 1 and a narrow passage 12 constitutes a restriction for hydraulic medium which can flow in a small quantity from the front side 4 to a space 13 on the rear side of the valve body 1. The pressure of the medium in the space 13 is denoted by $p_2$.

The hydraulic medium on the rear side of the valve body 1 flows from the space 13 through a duct 14 to an annular chamber 15 in a control valve 16; it exerts no resulting axial force on the valve body which consists of two valve parts 17 and 18. Valve part 17 comprises recesses 19, which extend from chamber 15 to an outlet space 20. The recesses 19 and the outlet space 20 constitute outlet ports for the hydraulic medium of pressure $p_2$. The outlet space 20 communicates with the duct 8 and hence also with the outlet duct for the hydraulic medium. The valve part 17 is loaded by a spring 21, the resilience of which is adjustable by means of a pin 22. The valve body 17, 18 is journalled hydrostatically to avoid frictional resistance and comprises means for damping the movement of the valve, so that good dynamic stability is obtained. Medium in the chamber 5, in which the pressure $p_1$ prevails, is conducted through a duct 23 to a chamber 24 in the control valve 16, and generates a force on the valve body 17, 18 equal to $p_1$ times the difference in the surface of the two valve parts 17 and 18.

When the control valve is in equilibrium, said force is equal to the force in the spring 21.

The operation of the pressure-regulating valve described may be explained as follows. Let it be assumed that the surface area of the front side of the valve body 1 on which the liquid pressure $p_1$ is operative, is equal to $F_1$. Let it further be assumed that the surface area of the valve body 1 bounding the space 13 is equal to $F_2$, and let it be assumed for the time being that the pressure $p_2$ is constant. The valve body 1 will be in an equilibrium condition and will hence not move in the cylinder 2 if the forces on the valve body 1, on either side are equal, so if $p_1F_1=p_2F_2$. The outlet ports constituted by the recesses 6 and the outlet chamber 7 have an orifice, the size of which depends upon the position of the valve body 1, so that a certain flow of hydraulic medium flows to the duct 8. When the pressure $p_1$, for example, increases, the valve body 1 moves upwards in the figure over such a distance that again a new equilibrium condition is obtained. The outlet ports have become larger, and hence also the flow of hydraulic medium. For the valve body 1 it again holds in the new equilibrium state, that $p_1F_1=p_2F_2$ and since it was assumed that $p_2$ was constant, the pressure $p_1$ has again automatically obtained the desired value. However, in this manner, a rather inaccurate adjustment of the pressure $p_1$ would result, while the regulating valve according to the invention is just meant for apparatus having an extremely high precision. The inaccuracy is the result of the fact that the static pressure on the whole surface $F_1$ of the valve body is not equal to $p_1$. Actually, hydraulic medium flows through the recesses 6, and since the speed of the medium in said outlet ports can have a large value, the static pressure in the recesses 6 is considerably lower than the pressure $p_1$. So the valve body 1 will move downwards until a new equilibrium condition is adjusted, the forces on either side of the valve body being equal again. The outlet ports, however, have then become smaller so that the pressure of the hydraulic medium to be regulated will be higher than the desirable value $p_1$.

In order to obtain the desired accuracy, means are provided, according to the invention, to compensate for the influence of the decrease of the static pressure in the recesses. For that purpose, the control valve 16 of the type described is used, in which the following principles are applied. These are very important so that the regulating valve will have extremely accurate adjustment:

(1) The equilibrium condition of the valve body of the control valve is determined by the pressure of the liquid which is ultimately to be regulated at the desirable value, in this case the pressure $p_1$;

(2) The liquid of pressure $p_1$ which adjusts the control valve (in chamber 24 $p_1$ exerts an axial force on the valve body 17, 18) does not flow;

(3) The flowing liquid which exerts a control force on the valve body 1, so in this case the pressure $p_2$, exerts no resulting axial force on the valve body 17, 18 of the control valve.

So the pressure $p_2$ is not kept constant as was assumed preliminarily. the pressure $p_2$ is brought at such a value by the control valve 16, the position of the valve body of which 17, 18 is adjusted by means of the pressure $p_1$ to be regulated, that the valve body 1 of the regulating valve assumes a position in which $p_1$ has just the desirable value. The pressure $p_1$ to be regulated ensures with the spring 21 an equilibrium condition of the control valve body 17, 18. The position of the valve body 17, 18 causes an outlet aperture 19, 20 of a particular size for the medium of pressure $p_2$, with which hence a particular value of the pressure $p_2$ is associated.

As a result of the low static pressure in the recesses 6 of the regulating valve, $p_1$ will become somewhat higher than the desirable pressure to be regulated in the space 5. This excessively high pressure $p_1$, however, also acts upon the control valve 16, namely in the chamber 24. The valve body 17, 18 of the control valve hence moves slightly upwards and the pressure $p_2$ decreases since the outlet port constituted by the recesses 19 and the outlet space 20 becomes slightly larger. The valve body 1 of the regulating valve is consequently moved upwards a bit and assumes an equilibrium condition in which $p_1$ does have the desirable value. By causing the liquid pressure $p_1$ to act upon the control valve to adjust the position of the valve body 17, 18, the deviation which occurs in the regulating valve as a result of the low static pressure in the recesses 6, is hence balanced. The valve described ensures an extremely great accuracy of the pressure $p_1$ to be regulated. The spring 21 will be of influence the position of the valve body of the control valve, and hence on the value of the control pressure $p_2$. However, the movements of the control valve are very small so that, consequently, the spring force will be substantially constant. Moreover, by a correct choice of the spring characteristic, the introduction of errors in the pressure $p_1$ to be regulated can be avoided.

The pressure regulating valve shown in the drawing may be subject to variations of structural details without departing from the scope of the invention. For example, the projecting part 3 of the valve body 1 may be omitted in which the valve body 1 and the cylinder 2 may be a stepped construction if a difference in surface area on the front and rear sides of the valve body 1 is desirable.

What is claimed is:

1. A pressure-regulating valve for adjusting at a desirable value a pressure of a hydraulic medium to be regulated, said valve comprising a valve body which is axially movable in a cylinder, the space in the cylinder on the front side of the valve body communicating with the hydraulic medium the pressure of which is to be regulated, the space in the cylinder on the rear side of the valve communicating with hydraulic medium in which an adjustable control pressure prevails, said two spaces communicating with each other through a restriction, characterized in that the outer circumference of the valve body comprises at least one recess which communicates with the space on the front side of the valve body and which opens into an outlet chamber incorporated in the cylinder, said outlet chamber communicating with an outlet duct for the hydraulic medium, the space on the front side of the regulating valve communicating with an annular chamber which is constituted in a spring-loaded control valve, said control valve comprising at least two cylindrical valve parts having mutually different outside diameters, said valve parts being axially guidable in a cylinder, one wall of the annular chamber being formed by an annular surface of the valve part having the largest outside diameter, said valve part comprising a further annular chamber which communicates through a duct with the space behind the regulating valve, the outer circumference of said valve part comprising at least one recess which communicates with the further annular chamber and which opens into an outlet space incorporated in the cylinder, said outlet space communicating with an outlet duct for the hydraulic medium.

2. A pressure-regulating valve for adjusting the pressure of a hydraulic medium to be regulated to a desired value, said valve comprising a cylinder, a valve body axially movable in said cylinder, a front space located in the cylinder on the front side of said valve body communicating with said hydraulic medium, a rear space located in the cylinder on the rear side of said valve communicating with a hydraulic medium having adjustable control pressure, a restriction located for communication between said front and rear spaces, at least one recess on the outer circumference of said valve body communicating with said front space and opening into an outlet chamber incorporated in said cylinder, an outlet duct for the hydraulic medium communicating with said outlet chamber, a spring loaded control valve having an annular chamber communicating with said front space, said control valve comprising at least two cylindrical valve parts of different outside diameter being axially guided in a cylinder, the valve part having the larger outside diameter having an annular surface forming one wall of said annular chamber, said valve part further comprising an annular chamber communicating through a duct with said rear space, at least one recess on the outer circumference of said valve part communicating with said further annular chamber and opening into an outlet space incorporated in the cylinder, said outlet space communicating with an outlet duct for the hydraulic medium.

References Cited

UNITED STATES PATENTS

| | | | |
|---|---|---|---|
| 398,841 | 3/1889 | Mayer | 137—491 |
| 2,091,596 | 8/1937 | Kluppel | 137—491 |
| 2,688,977 | 9/1954 | Droitcour et al. | 137—491 |
| 3,402,734 | 9/1968 | Robbins | 137—491 |

M. CARY NELSON, Primary Examiner

R. B. ROTHMAN, Assistant Examiner